US011745584B2

United States Patent
Takahashi et al.

(10) Patent No.: US 11,745,584 B2
(45) Date of Patent: *Sep. 5, 2023

(54) PTO SHAFT DRIVING DEVICE IN WORKING MACHINE

(71) Applicant: KUBOTA CORPORATION, Osaka (JP)

(72) Inventors: Keiji Takahashi, Sakai (JP); Tatsuya Sakai, Sakai (JP); Tsuyoshi Gono, Sakai (JP); Norita Tottori, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 171 days.

This patent is subject to a terminal disclaimer.

(21) Appl. No.: 17/358,063

(22) Filed: Jun. 25, 2021

(65) Prior Publication Data

US 2021/0402874 A1 Dec. 30, 2021

(30) Foreign Application Priority Data

Jun. 30, 2020 (JP) .................................. 2020-112968

(51) Int. Cl.
*B60K 17/28* (2006.01)
*B60K 25/06* (2006.01)
(Continued)

(52) U.S. Cl.
CPC .............. *B60K 17/28* (2013.01); *B60K 25/06* (2013.01); *B60K 28/04* (2013.01); *B60K 28/165* (2013.01)

(58) Field of Classification Search
None
See application file for complete search history.

(56) References Cited

U.S. PATENT DOCUMENTS 5,103,951 A    4/1992  Inui et al.
10,632,841 B2* 4/2020  Togo ................... F16H 63/483

FOREIGN PATENT DOCUMENTS

JP       04-57645 U     5/1992
JP    2017-226325 A    12/2017
JP     2019-62794 A     4/2019

OTHER PUBLICATIONS

Official Communication issued in corresponding Japanese Patent Application No. 2020-112968, dated May 9, 2023.

* cited by examiner

*Primary Examiner* — Faye M Fleming
(74) *Attorney, Agent, or Firm* — KEATING AND BENNETT, LLP

(57) ABSTRACT

A PTO shaft driving device in a working machine, includes a parking switch to detect parking of a vehicle body, a first switch located on a manipulator located on the vehicle body to output a PTO shaft control command that is either a driving command to drive a PTO shaft located on the vehicle body or a stopping command to stop the PTO shaft, a second switch located at a position different from the manipulator to output a PTO shaft control command that is either a driving command to drive the PTO shaft or a stopping command to stop the PTO shaft, a first permission switch to selectively permit or prohibit a stationary work when the parking switch detects the parking, and a controller configured or programmed to control driving of the PTO shaft. The controller is configured or programmed to selectively drive or stop the PTO shaft according to the PTO shaft control command from the first switch or the second switch when the stationary work is permitted by the first permission switch.

20 Claims, 8 Drawing Sheets

(51) Int. Cl.
*B60K 28/16* (2006.01)
*B60K 28/04* (2006.01)

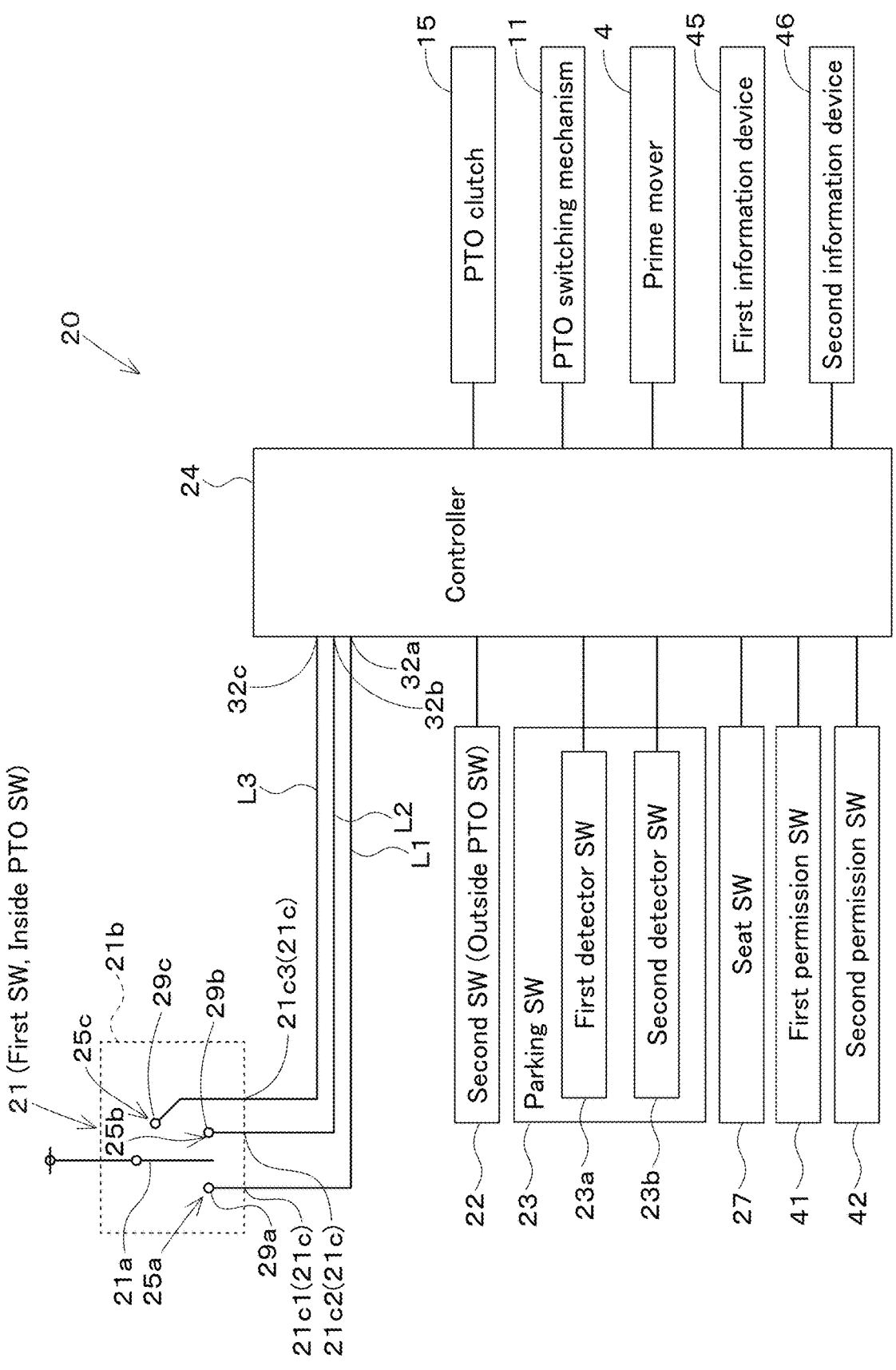

Fig.4

| Sitting·Not sitting | PTO work mode | Rear PTO shaft | |
|---|---|---|---|
| | | Inside PTO SW Operation | Outside PTO SW operation |
| Sitting | Stationary work prohibition mode | Controllable (Driving/Stopping) | Prohibition (Impossible) |
| Sitting | Outside operation permission mode | | Controllable (Driving/Stopping) |
| Sitting | Stationary work permission mode | Controllable (Driving/Stopping) | |
| Not sitting | Stationary work prohibition mode | Prohibition (Impossible) | Prohibition (Impossible) |
| Not sitting | Outside operation permission mode | | Controllable (Driving/Stopping) |
| Not sitting | Stationary work permission mode | Controllable (Driving/Stopping) | |

PTO SHAFT DRIVING DEVICE IN WORKING MACHINE

CROSS REFERENCE TO RELATED APPLICATIONS

This application claims the benefit of priority to Japanese Patent Application No. 2020-112968 filed on Jun. 30, 2020. The entire contents of this application are hereby incorporated herein by reference.

BACKGROUND OF THE INVENTION

1. Field of the Invention

The present invention relates to a PTO shaft driving device in a working machine such as a tractor.

2. Description of the Related Art

The technique disclosed in Japanese Unexamined Patent Application Publication No. 2017-226325 is known as a technique for driving a PTO shaft to be driven by an engine power in a working machine such as a tractor.

The PTO shaft driving device in the working machine disclosed in Japanese Unexamined Patent Application Publication No. 2017-226325 includes a parking switch capable of detecting parking of a vehicle body, an inside PTO switch located in a manipulator located in the vehicle body and configured to switch on and off driving of the PTO shaft located in the vehicle body, an outside PTO switch located at a position different from the manipulator and configured to switch on and off driving of the PTO shaft, and a controller to drive the PTO shaft when at least one of the inside PTO switch or outside PTO switch is switched on.

SUMMARY OF THE INVENTION

A PTO shaft driving device in a working machine, includes a parking switch to detect parking of a vehicle body, a first switch located on a manipulator located on the vehicle body to output a PTO shaft control command that is either a driving command to drive a PTO shaft located on the vehicle body or a stopping command to stop the PTO shaft, a second switch located at a position different from the manipulator to output a PTO shaft control command that is either a driving command to drive the PTO shaft or a stopping command to stop the PTO shaft, a first permission switch to selectively permit or prohibit a stationary work when the parking switch detects the parking, and a controller configured or programmed to control driving of the PTO shaft. The controller is configured or programmed to selectively drive or stop the PTO shaft according to the PTO shaft control command from the first switch or the second switch when the stationary work is permitted by the first permission switch.

The controller is configured or programmed to stop driving of the PTO shaft when the controller acquires the stopping command from the first switch after the PTO shaft is driven according to the driving command from the second switch.

The controller is configured or programmed to stop driving of the PTO shaft when the controller acquires both the driving command from the first switch and the driving command from the second switch.

The PTO shaft driving device in the working machine includes a prime mover to output a driving force for the PTO shaft. The controller is configured or programmed to stop the prime mover when the stationary work having been permitted is prohibited while the PTO shaft is driven.

The controller is configured or programmed to stop the prime mover when the second switch outputs the driving command while the stationary work is prohibited.

The PTO shaft driving device in the working machine includes a first information transmitter to output a warning when the second switch outputs the driving command while the stationary work is prohibited.

The PTO shaft located on the vehicle body is defined as a rear PTO shaft of the working machine which includes a front PTO shaft in addition to the rear PTO shaft. The PTO shaft driving device in the working machine includes a second permission switch to selectively permit or prohibit driving of the front PTO shaft when the second switch outputs the driving command to drive both the rear PTO shaft and the front PTO shaft, and a second information transmitter to optically inform of either permission and prohibition of the stationary work or permission and prohibition by the second permission switch.

The PTO shaft driving device in the working machine includes a seat switch to detect sitting of a driver on a driver seat. When the seat switch detects the sitting of the driver and the controller acquires the PTO shaft control command from the first switch, the controller is configured or programmed to respond to the PTO shaft control command from the first switch to drive or stop the PTO shaft. When the seat switch does not detect the sitting of the driver and the controller acquires the PTO shaft control command from the first switch, the controller is configured or programmed to not respond to the PTO shaft control command from the first switch to drive or stop the PTO shaft.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 2 is an overall view of a PTO shaft driving device in a working machine.

FIG. 4 is a view showing a stationary work permission mode, a stationary work prohibition mode, and an outside operation permission mode.

DETAILED DESCRIPTION OF THE PREFERRED EMBODIMENTS

Figure 1:
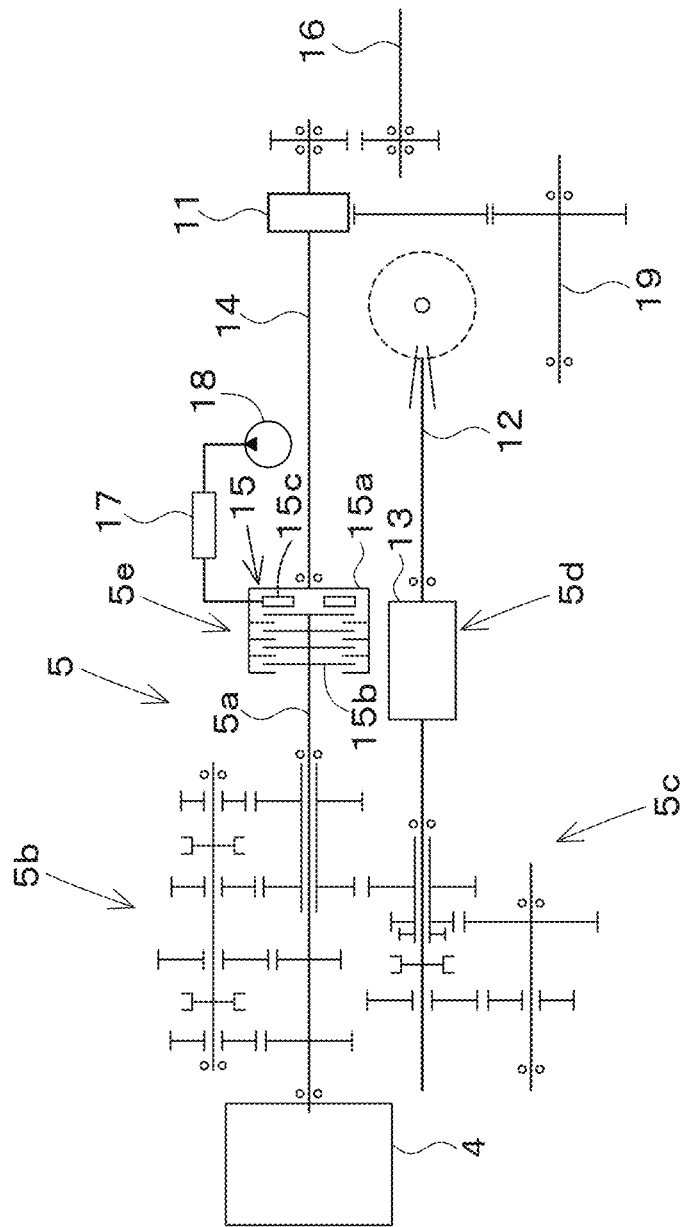
FIG. 1 is an overall schematic view of a transmission device.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, preferred embodiments of the present invention will be described below.

Figure 7:
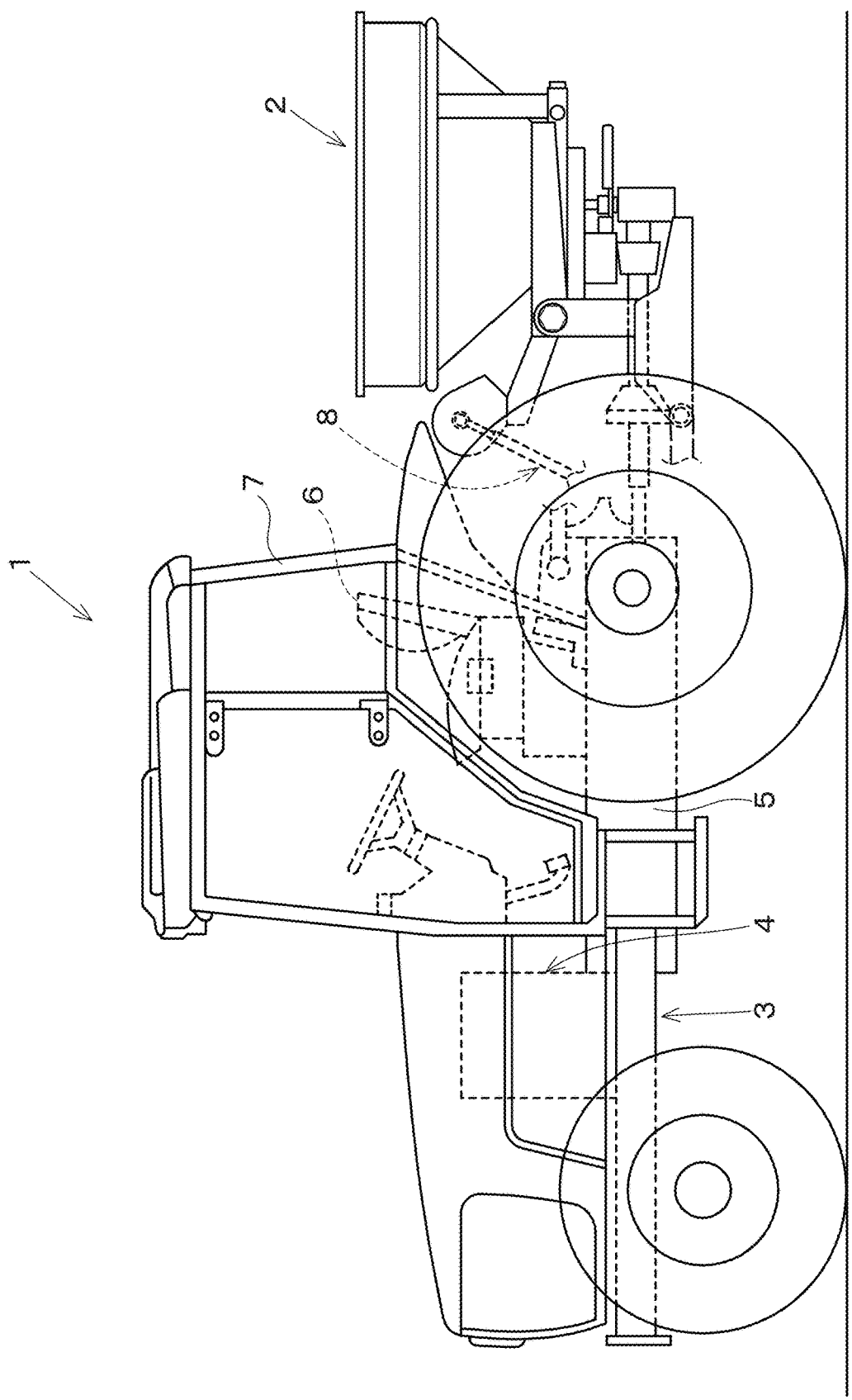
FIG. 7 is an overall view of a working machine.

FIG. 7 shows an overall view of a working machine 1 including a PTO shaft driving device according to the present preferred embodiment. Although the working machine 1 shown in FIG. 7 is a tractor, the working machine 1 is not limited to the tractor but may be an agricultural machine such as combine harvesters, rice transplanters, and the like, or may be a construction machine, or the like.

First, an overall configuration of the tractor 1 will be described.

As shown in FIG. 7, the tractor 1 includes a traveling body (hereinafter referred to as a vehicle body) 3 having wheels, a prime mover 4, and a transmission device 5. The prime mover 4 is a diesel engine, a gasoline engine, an electric motor, or the like. In the present preferred embodiment, the prime mover 4 is a diesel engine (hereinafter referred to as an "engine").

Figure 6:
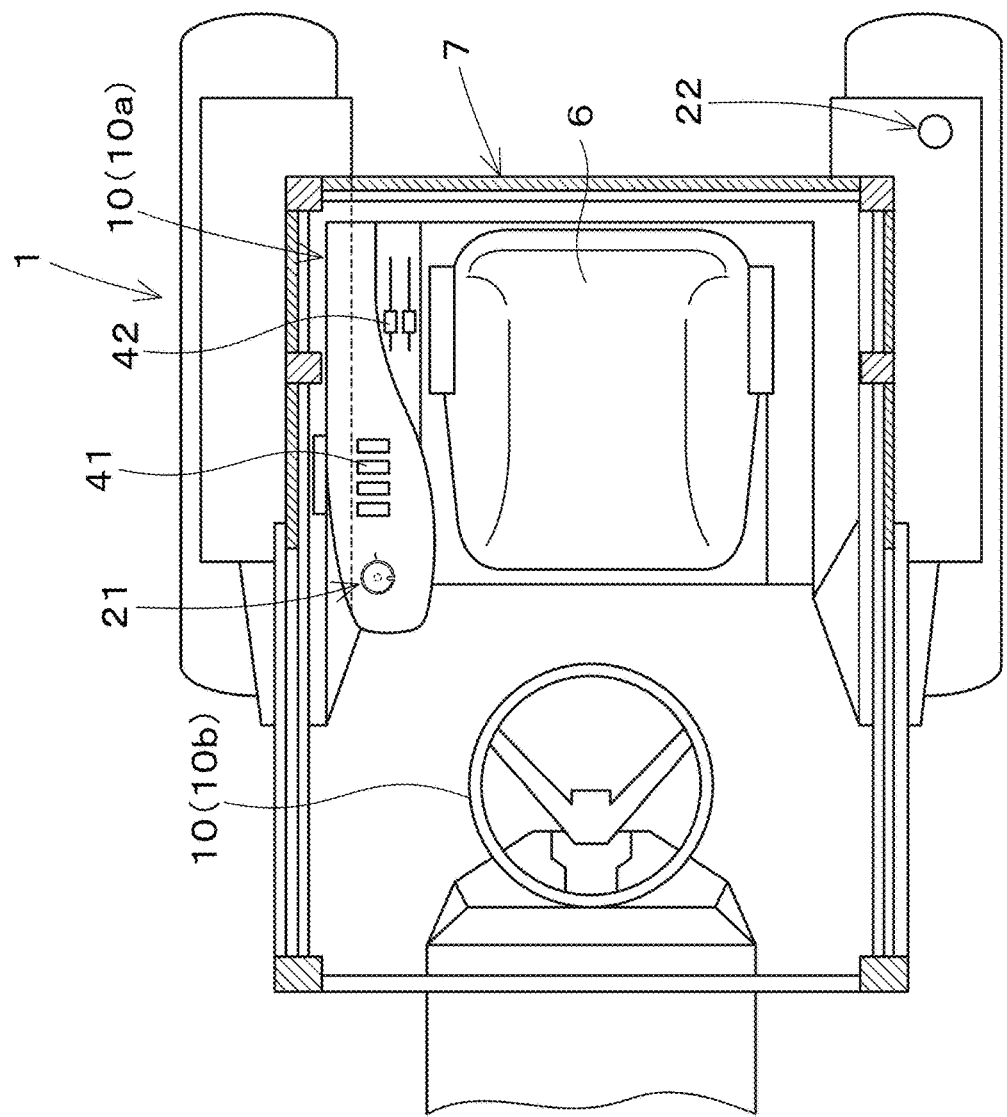
FIG. 6 is a view showing an inside of a cabin.

A driver seat 6 and a cabin 7 surrounding the driver seat 6 are mounted on the vehicle body 3. As shown in FIG. 6, a manipulator 10 for various operations of the tractor 1 (that is, the vehicle body 3) is located inside the cabin 7. The manipulator 10 is located in front of or on a lateral portion of the driver seat 6, for example. The manipulator 10 includes a manipulator console 10a located on the lateral portion of the driver seat 6 and a steering wheel 10c located in front of the driver seat 6. The manipulator console 10a includes an operation lever supported swingably, a switch, a rotary dial, and the like.

As shown in FIG. 7, a connector device 8 including a three-point linkage mechanism or the like is located on a rear portion of the vehicle body 3. A working device 2 can be releasably attached to the connector device 8. For example, when the working device 2 such as a cultivator, a fertilizer applicator, a chemical sprayer is connected to the connector device 8, the working device 2 can be towed by the vehicle body 3.

As shown in FIG. 1, the transmission device 5 includes a main shaft (propulsion shaft) 5a, a main transmission portion 5b, a sub transmission portion 5c, a shuttle portion 5d, and a PTO power transmission portion 5e. The propulsion shaft 5a is rotatably supported by a housing case of the transmission device 5, and a power from the crankshaft of the prime mover 4 is transmitted to the propulsion shaft 5a. The main transmission portion 5b includes a plurality of gears and a shifter for changing engagements between the gears. The main transmission portion 5b appropriately changes connections (engagements) between the plurality of gears with the shifter to change and outputs a rotation input from the propulsion shaft 5a (that is, changes a rotation speed).

The sub transmission portion 5c includes a plurality of gears and a shifter for changing engagements between the gears as in the main gear shift portion 5b. The sub transmission portion 5c appropriately changes connections (engagements) between the plurality of gears with the shifter to change and outputs a rotation input from the main gear shift portion 5b (that is, changes a rotation speed).

The shuttle portion 5d includes a shuttle shaft 12 and a forward/reverse switching portion 13. A power output from the sub-shift portion 5c is transmitted to the shuttle shaft 12 through gears and the like. The forward/reverse switching portion 13 includes, for example, a hydraulic clutch or the like, and switches a rotational direction of the shuttle shaft 12 by engaging and disengaging the hydraulic clutch, to switch a traveling direction of the tractor 1 between forward and backward.

The PTO power transmission portion 5e includes a PTO propulsion shaft 14 and a PTO clutch 15. The PTO propulsion shaft 14 is rotatably supported and is capable of transmitting a power from the propulsion shaft. The PTO propulsion shaft 14 is connected to the rear PTO shaft 16 with a gear or the like. The PTO clutch 15 is configured to be switched between an engaged state where a power of the propulsion shaft 5a is transmitted to the PTO propulsion shaft 14 and a disengaged state where the power of the propulsion shaft 5a is not transmitted to the PTO propulsion shaft 14. Specifically, the PTO clutch 15 includes a hydraulic clutch, and a housing 15a capable of rotating integrally with the PTO propulsion shaft 14, a clutch member 15b capable of rotating integrally with the propulsion shaft 5a, and a piston 15c capable of being moved in the housing 15a by hydraulic fluid.

Thus, when the piston 15c is moved to engage the clutch member 15b with the housing 15a, the PTO clutch 15 is in the engaged state, and a power from the prime mover 4 is transmitted to the PTO propulsion shaft 14 through the propulsion shaft 5a and the PTO clutch 15, to drive at least the rear PTO shaft 16. On the other hand, when the piston 15c is moved to disengage the clutch member 15b from the housing 15a, the PTO clutch 15 is in the disengaged state, and a power of the propulsion shaft 5a is not transmitted to the PTO propulsion shaft 14, to disconnect the power of the propulsion shaft 5a. The transmission or disconnection of power by the PTO clutch 15 is performed by an actuation valve 17 (that is, a solenoid valve) connected to the piston 15c with a fluid line. A pump 18 configured to supply hydraulic fluid (oil) is connected to the actuation valve 17.

The transmission device 5 includes a front PTO shaft 19 to transmit power to a front portion of the tractor 1. In addition, the PTO propulsion shaft 14 includes a PTO switching mechanism 11 configured to be switched between a rear position where a power is transmitted only to the rear PTO shaft 16 and a both-driving position where a power is transmitted to the rear PTO shaft 16 and the front PTO shaft 19.

FIG. 2 shows a PTO shaft driving device 20.

The PTO shaft driving device 20 includes a first switch 21, a second switch 22, a parking switch 23, and a controller 24. The first switch 21, the second switch 22, and the parking switch 23 are connected to the controller 24. In FIG. 2, each of the switches is indicated by a reference sign "SW".

As shown in FIG. 6, the first switch 21 is located on the manipulator console 10a of the manipulator 10, and is a switch for outputting a PTO shaft control command that is either a driving command to drive the rear PTO shaft 16 or a stopping command to stop the rear PTO shaft 16. As shown in FIG. 1, the first switch 21 is capable of being switched among three positions, a neutral position (referred to as an N position or a third position) 25a, an ON position (referred to as a first position) 25b, and an OFF position (referred to as a second position) 25c. When the first switch 21 is in the N position 25a, a signal indicating that the switch is in the N position 25a is input to the controller 24 via an output terminal 29a. When the first switch 21 is in the ON position 25b, a signal indicating that the switch is in the ON position 25b is input to the controller 24 via an output terminal (that is, a first output terminal) 29b. When the first switch 21 is in the OFF position 25c, a signal indicating that the switch is in the OFF position 25c is input to the controller 24 via an output terminal (that is, a second output terminal) 29c.

When the first switch 21 is in the N position 25a, the controller 24 knows that the first switch 21 is in the N position. When the first switch 21 is in the ON position 25b, the controller 24 acquires the driving command to drive the rear PTO shaft 16. When the first switch 21 is in the OFF position 25c, the controller 24 acquires the stopping command to stop driving of the rear PTO shaft 16.

In the present preferred embodiment, a line connecting the output terminal 29c of the first switch 21 to the controller 24 is branched into a plurality of lines. Specifically, the first switch 21 includes an operation portion 21a for performing a switching operation, a main body 21b provided with a plurality of output terminals (that is, contacts), and a connector 21c located in the main body 21b and configured to connect lines L1, L2, and L3. The connector 21c includes a first connector 21c1 connected to the output terminal (that is, a contact) 29a, a second connector 21c2 connected to the output terminal (that is, a contact) 29b, and a third connector 21c3 connected to the output terminal (that is, a contact) 29c.

The first connector 21c1 and the first input portion 32a of the controller 24 are connected by the first line L1. The second connector 21c2 and the second input portion 32b of the controller 24 are connected by the second line L2. The third connector 21c3 and the third input portion 32c of the controller 24 are connected by the third line L3.

Thus, the controller 24 recognizes that driving of the rear PTO shaft 16 is turned to an "off" state when acquiring a signal input from at least one of the lines L among the plurality of lines L1, L2, and L3. Thus, even if some of the lines L are, for example, disconnected for some reason, the driving of the rear PTO shaft 16 can be stopped when at least remaining one of the lines L is connected to the controller 24.

Figure 3A:
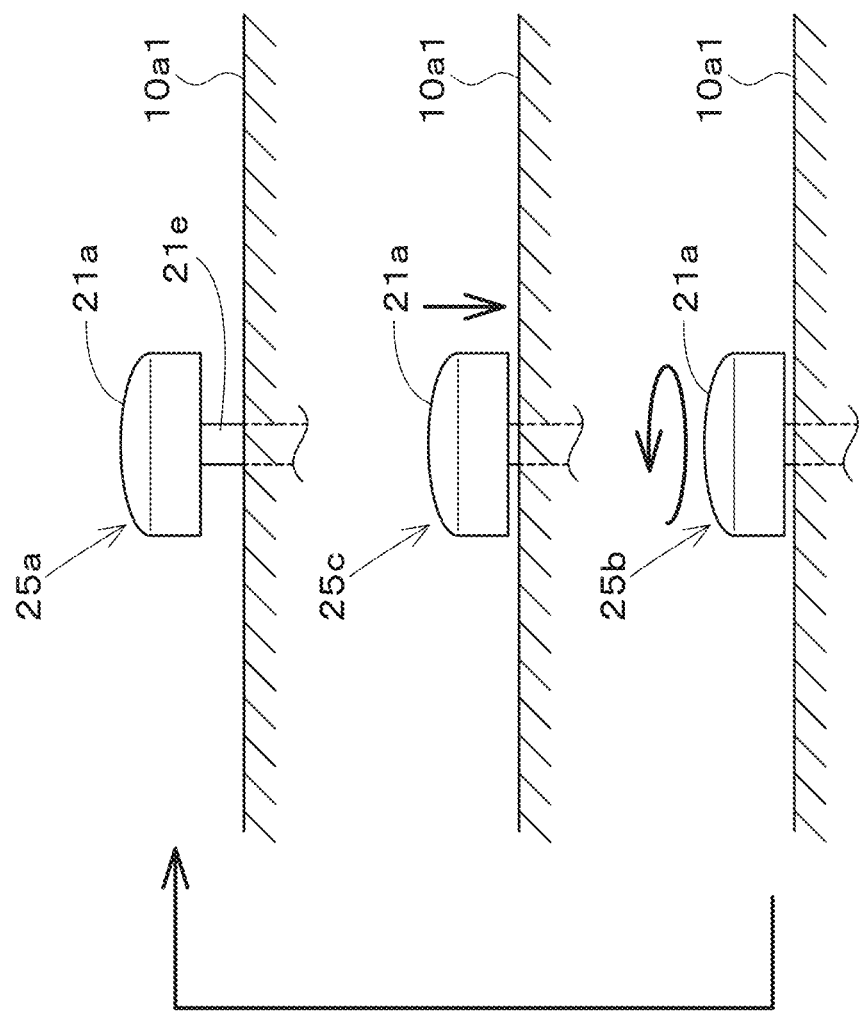
FIG. 3A is a view of a motion of a first switch (an inside PTO switch) seen from a side.
Figure 3B:
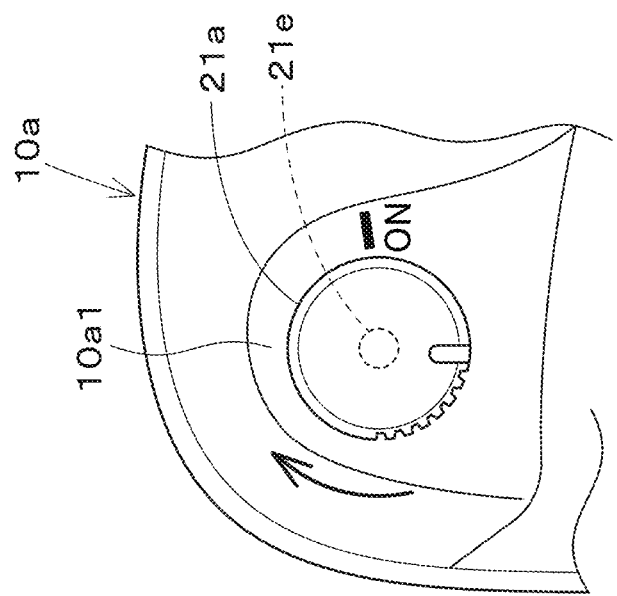
FIG. 3B is a plan view of the first switch (the inside PTO switch).

As shown in FIGS. 3A and 3B, the first switch 21 is configured to be pushed in and rotated. The operating portion 21a is circular in plan view, and is rotatably supported by a support portion 21e. An end portion of the support portion 21e is connected to the main body 21b. For convenience of explanation, the operation portion 21a will be referred to as the rotary portion 21a.

An upper position at which the rotary portion 21a of the first switch 21 is separated from an upper surface 10a1 of the manipulator console 10a is the N position 25a. When the rotary portion 21a is pushed in from the upper position (that is, the N position 25a) to a lower position at which the rotary portion 21a is close to the upper surface 10a1 of the manipulator console 10a, the first switch 21 is in the OFF position 25c. When the rotary portion 21a is rotated from the lower position (that is, the OFF position) 25c to a predetermined position, the first switch 21 is in the ON position 25b. After the first switch 21 is operated to the predetermined position (that is, the ON position 25b), when the rotary portion 21a is released, the rotary portion 21a automatically returns to the upper position via the lower position. That is, the first switch 21 is a momentary switch that automatically returns from the OFF position 25c to the N position 25a.

As shown in FIG. 6, the second switch 22 is located at a different position from the manipulator 10, and outputs a PTO shaft control command that is either a driving command to drive the rear PTO shaft 16 or a stopping command to stop the rear PTO shaft 16 in the same way as the first switch 21. Specifically, the second switch 22 is located at an upper portion of a rear wheel fender outside the cabin 7 or outwardly at a rear portion of the cabin 7. That is, the second switch 22 is located at the rear portion or lateral portion of the vehicle body 3, and the second switch 22 is located at a different position from the first switch 21, and can be operated by a worker or the like outside the cabin 9 or the like, that is, outside the manipulator 10.

The second switch 22 is capable of being switched on and off. For example, when the second switch 22 is turned on, the controller 24 acquires a driving command to drive the rear PTO shaft 16. When the second switch 22 is turned off, the controller 24 acquires a stopping command to stop driving of the rear PTO shaft 16.

As shown in FIG. 2, the parking switch 23 is capable of detecting parking of the vehicle body 3. The parking switch 23 includes a first detector switch 23a and a second detector switch 23b. The first detector switch 23a turns on when a parking lever (that is, a parking brake), which is pivotably supported by the vehicle body 3, is in a position to brake the vehicle body 3 (that is, a braking position), and turns off when the parking lever is in a position to release the braking of the vehicle body 3 (that is, a release position). The second detector switch 23b turns on when the braking device, which performs the braking of the vehicle body 3, is in the braking state, and turns off when the braking device is in a state where the braking is released (that is, a brake-releasing state). In detail, the braking device is configured to lock (that is, to stop) rotation of gears on a drive shaft (for example, a drive shaft to transmit power to the differential device) installed in the transmission device 5. The second detector switch 23b turns on in the braking state where a locking member of the braking device engages with the gears on the drive shaft to stop the rotation of the drive shaft. The second detector switch 23b turns off in the brake-releasing state where the locking member of the braking device is released from the gears on the drive shaft to allow the rotation of the drive shaft.

The parking switch 23 detects parking of the vehicle body 3 when the first detector switch 23a and the second detector switch 23b are turned on. The parking switch 23 does not detect parking of the vehicle body 3 when the first detector switch 23a and the second detector switch 23b are turned off.

In the present preferred embodiment, the parking switch includes both the first detector switch 23a and the second detector switch 23b, but include any one of the switches. For example, when the parking switch 23 includes only the first detector switch 23a, parking of the vehicle body 3 is detected when the first detector switch 23a is turned on, and parking of the vehicle body 3 is not detected when the first detector switch 23a is turned off. When the parking switch 23 includes only the second detector switch 23b, parking of the vehicle body 3 is detected when the second detector switch 23b is turned on, and parking of the vehicle body 3 is not detected when the second detector switch 23b is turned off.

The PTO shaft driving device 20 also includes a seat switch 27. The seat switch 27 is connected to the controller 24.

The seat switch 27 detects operators sitting on the driver seat 6. For example, the seat switch 27 can be switched between on and off. The seat switch 27 is located inside or below the seat (that is, a seat portion or a backrest) of the driver seat 6. When an operator sits on the seat, the seat switch 27 turns on to detect the operator's sitting. When the operator leaves the seat, the seat switch 27 turns off because it does not detect the sitting of a driver.

As shown in FIG. 2, the PTO shaft driving device 20 includes a first permission switch 41 and a second permission switch 42. The first permission switch 41 and the second permission switch 42 are connected to the controller 24. As shown in FIG. 6, for example, the first permission switch 41 and the second permission switch 42 are located on a manipulator console 40a.

The first permission switch 41 is configured to permit or prohibit stationary work when at least the parking switch 23 detects the parking, and is switchable on and off. For example, when the first permission switch 41 is turned on, the first permission switch 41 issues a permission command to permit the stationary work when it is turned on, and when the first permission switch 41 is turned off, the first permission switch 41 issues a prohibition command to prohibit the stationary work.

The second permission switch 42 permits or prohibits that the rear PTO shaft 16 is driven or stopped in accordance with the command of the second switch 22. The second permission switch 42 commands the PTO switching mechanism 11 to be set at either the rear position or the both-driving position. When the second permission switch 42 outputs a command to switch to the rear position, driving of the rear PTO shaft 16 is permitted and driving of the front PTO shaft 19 is not permitted (no power is transmitted to the front PTO shaft 19). When the second permission switch 42 outputs a command to switch to both-driving position, the driving of the rear PTO shaft 16 and the driving of the front PTO shaft 19 are permitted.

The controller 24 shown in FIG. 2 performs a control relating to driving of the PTO propulsion shaft 14 and the like, that is, a control relating to the PTO shafts (that is, the rear PTO shaft 16 and the front PTO shaft) (hereinafter referred to as PTO control). The controller 24 performs the PTO control to drive or stop the rear PTO shaft 16. Specifically, the controller 24 is capable of performing switching of the PTO clutch, stopping of driving of the prime mover 4, switching of the PTO switching mechanism 11, and the like.

To stop driving of the PTO propulsion shaft 14, that is, when stopping driving of the PTO shafts (that is, the rear PTO shaft 16 and the front PTO shaft 19), the controller 24 demagnetizes a solenoid of the actuation valve (that is, a solenoid valve) 17, and thereby the PTO clutch 15 is in a disengaged state. To stop driving of the PTO shafts (that is, the rear PTO shaft 16 and the front PTO shaft), the controller 24 magnetizes the solenoid of the actuation valve (that is, the solenoid valve) 17, and thereby the PTO clutch 15 is in an engaged state.

The controller 24 switches the PTO switching mechanism 11 to the rear position to stop the driving of the front PTO shaft 19, and switches the PTO switching mechanism 11 to the both-driving position to drive the front PTO shaft 19.

The controller 24 performs the PTO control at least based on the first permission switch 41 and the commands of the first and second switches 21 and 22.

In the following description, for convenience of explanation, the first switch 21 may be referred to as an "inside PTO switch 21", the second switch 22 as an "outside PTO switch 22", and the first permission switch 41 as a "stationary PTO switch". In addition, the following explanation is made assuming that the PTO switching mechanism 11 is installed.

When a stationary work is permitted by the stationary PTO switch 41, the controller 24 drives or stops the rear PTO shaft 16 according to the command of the inside PTO switch 21 or the outside PTO switch 22.

As shown in FIG. 4, when the stationary PTO switch 41 is turned on at least with the parking switch 23 detecting parking, the "stationary work permission mode" for permitting a stationary work is executed. The stationary work permission mode can be executed regardless of whether a driver or other person sits on the driver seat 6 or not, that is, regardless of whether the seat switch 27 is turned on or off.

In the stationary work permission mode, when the inside PTO switch 21 is switched to the ON position 25b, the controller switches the PTO clutch 15 to an engaged state and the PTO switching mechanism 11 to the rear position, and thus drives the rear PTO shaft 16. In the stationary work permission mode, when the inside PTO switch 21 is switched to the OFF position 25c, the controller 24 switches the PTO clutch 15 to a disengaged state to stop driving of the rear PTO shaft 16.

In the stationary work permission mode, when the outside PTO switch 22 is turned on, the controller 24 switches the PTO clutch 15 to an engaged state and the PTO switching mechanism 11 to the rear position, and thus drives the rear PTO shaft 16. In the stationary work permission mode, when the outside PTO switch 22 is switched from on to off, the controller 24 switches the PTO clutch 15 to a disengaged state and stops driving of the rear PTO shaft 16.

In the stationary work permission mode, to drive the rear PTO shaft 16 according to a driving command from the outside PTO switch 22 (that is, the outside PTO switch 22 is turned on), the controller 24 switches the PTO clutch 15 to the disengaged state to stop the driving of the rear PTO shaft 16 when the inside PTO switch 21 is switched to the OFF position 25c. That is, when the rear PTO shaft 16 is driven according to an operation of the outside PTO switch 22 in a state where the stationary work permission mode is executed, the rear PTO shaft 16 can be stopped also according to an operation of the inside PTO switch 21.

In the stationary work permission mode, when acquiring both a command to drive the rear PTO shaft 16 by switching the inside PTO switch 21 to the ON position 25b (referred to as an inside command) and a command to drive the rear PTO shaft 16 by switching the outside PTO switch 22 to the ON position (referred to as an external command), the controller 24 switches the PTO clutch 15 to a disengaged state to stop driving of the rear PTO shaft 16.

For example, the controller 24 stops driving of the rear PTO shaft 16 when the outside PTO switch 22 is turned on with the inside PTO switch 21 held at the ON position 25b. Alternatively, the controller 24 stops the driving of the rear PTO shaft 16 when the inside PTO switch 21 is switched to the ON position 25b with the outside PTO switch 22 held on.

In the above-described preferred embodiment, the stationary work permission mode is executed under a condition where the parking switch 23 detects parking and the stationary PTO switch 41 is turned on. In addition to that, the condition may include that the PTO switching mechanism 11 is at the rear position. That is, the stationary work permission mode may be executed when the parking switch 23 detects parking, the PTO switching mechanism 11 is in the rear position, and the stationary PTO switch 41 is turned on.

As shown in FIG. 4, a stationary work prohibition mode is executed when the parking switch 23 detects no parking regardless of whether the stationary PTO switch 41 is turned on or off. As described above, when the stationary work permission mode includes a condition that the PTO switching mechanism 11 is in the rear position, the stationary work prohibition mode is executed regardless of whether the stationary PTO switch 41 is turned on or off when the PTO switching mechanism 11 is in the both-driving position.

In the stationary work prohibition mode, when a driver or other person sits on the driver seat 6 (that is, the seat switch 27 is turned on) and the inside PTO switch 21 is turned on, the controller 24 switches the PTO clutch 15 to be in the engaged state to drive the rear PTO shaft 16. In the stationary work prohibition mode, when a driver or other person sits on the driver seat 6 and the inside PTO switch 21 is turned off, the controller 24 switches the PTO clutch 15 to be in the disengaged state to stop driving of the rear PTO shaft 16.

In the stationary work prohibition mode, when a driver or other person does not sit on the driver seat 6 (that is, the seat switch 27 is turned off), the controller 24 switches the PTO clutch 15 to be in the disengaged state not to drive the rear PTO shaft 16, regardless of an operation (that is, the on/off operation) of the inside PTO switch 21.

That is, in the stationary work prohibition mode, when acquiring a command (that is, an inside command) of the inside PTO switch 21 while the seat switch 27 detects an operator's sitting, the controller 24 responds to the inside command to drive the rear PTO shaft 16, and when acquiring the command (that is, the inside command) of the inside PTO switch 21 while the seat switch 27 detects no operator's sitting, the controller 24 does not respond to the inside PTO shaft control command to drive or stop the rear PTO shaft 16.

In the stationary work prohibition mode, the controller 24 holds the PTO clutch 15 to be in the disengaged state and does not drive the rear PTO shaft 16, regardless of whether the outside PTO switch 22 is turned on or off. Here, the controller 24 stops the prime mover 4 when the outside PTO switch 22 is turned on from its off state (when the outside PTO switch 22 outputs the driving command) when the stationary work is prohibited, that is, when being in the stationary work prohibition mode.

Alternatively, as described above, when the outside PTO switch 22 is turned on, the controller 24 stops the prime mover 4 even after parking of the tractor 1 is no longer detected in the stationary work permission mode and then the mode is switched from the stationary work permission mode to the stationary work prohibition mode.

As described above, in the stationary work prohibition mode, when the outside PTO switch 22 is turned on, that is, when a special operation is performed, the tractor 1 informs that the special operation has been performed. Specifically, the tractor includes a buzzer to generate a warning sound and an information device (referred to as a first warning device) 45 to display a warning message, and the first warning device 45 informs by sound, display, or the like that the special operation is performed.

As shown in FIG. 4, when the stationary PTO switch 41 is turned off at least with the parking switch 23 detecting parking, an "outside operation permission mode" is executed.

In the outside operation permission mode, when a driver or other person sits on the driver seat 6 and the inside PTO switch 21 is turned on, the controller 24 switches the PTO clutch 15 to be in the engaged state to drive the rear PTO shaft 16. In the outside operation permission mode, when the driver or other person sits on the driver seat 6 and the inside PTO switch 21 is switched from on to off, the controller 24 switches the PTO clutch 15 to be in the disengaged state to stop driving of the rear PTO shaft 16.

In the outside operation permission mode, when the driver or other person sits on the driver seat 6 and the outside PTO switch 22 is turned on, the controller 24 switches the PTO clutch 15 to be in the engaged state to drive the rear PTO shaft 16. In the outside operation permission mode, when the driver or other person sits on the driver seat 6 and the outside PTO switch 22 is switched from on to off, the controller 24 switches the PTO clutch 15 to be in the disengaged state to stop driving of the rear PTO shaft 16.

On the other hand, in the outside operation permission mode, when the driver or other person does not sit on the driver seat 6, the controller 24 holds the PTO clutch 15 to be in the disengaged state not to drive the rear PTO shaft 16, regardless of whether the inside PTO switch 21 is switched to on or off. In the outside operation permission mode, when the driver or other person does not sit on the driver seat 6, the controller 24 switches the PTO clutch 15 to be in the disengaged state or the engaged state depending on whether the outside PTO switch 22 is switched to on or to off, thereby driving the rear PTO shaft 16 and stopping driving of the rear PTO shaft 16.

Figure 5:
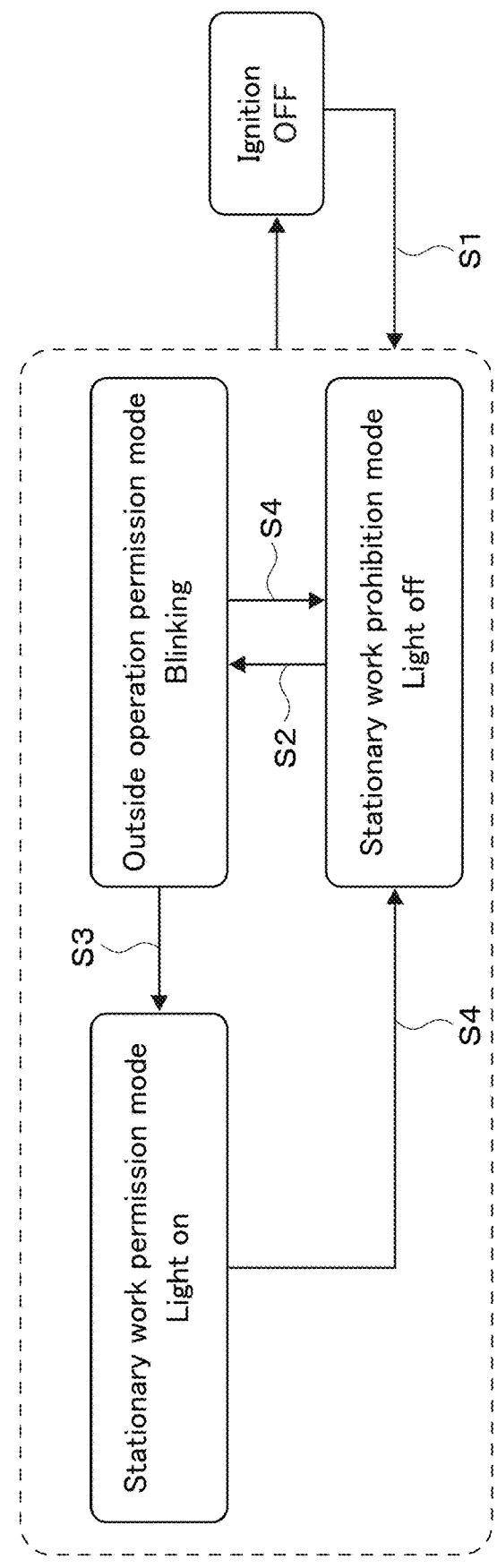
FIG. 5 is a transition view of switching between the stationary work permission mode, the stationary work prohibition mode, and the outside operation permission mode.

FIG. 5 is a view showing a state transition diagram of the stationary work permission mode, the stationary work prohibition mode, and the outside operation permission mode.

As shown in FIG. 5, when the ignition switch is turned on from a state where the ignition switch for driving the prime mover 4 is turned off (referred to as a key off state), the mode transits to the stationary work prohibition mode when parking of the tractor 1 is not detected or the PTO switching mechanism 11 is in the both-driving position (step S1).

In the stationary work prohibition mode, the mode transits to the outside operation permission mode when parking of the tractor 1 is detected with the PTO switching mechanism 11 being in the rear position and the stationary PTO switch 41 being off (step S2).

In the outside operation permission mode, when the stationary PTO switch 41 is held ON for a predetermined time or longer, the mode transits to the stationary work permission mode (step S3).

When parking of the tractor 1 is not detected in either the stationary work permission mode or the outside operation permission mode, or when the PTO switching mechanism 11 is in the both-driving position, the mode returns to the stationary work prohibition mode (step S4).

The tractor 1 includes a second information device 46. The second information device 46 is located around the driver seat 6. The second information device 46 includes a light source such as an LED. The second information device 46 uses a light source (light) to inform which one of the stationary work permission mode, the stationary work prohibition mode, and the outside operation permission mode is selected. For example, the second information device 46 indicates the stationary work prohibition mode by turning off the light, indicates the outside operation permission mode by blinking the light, and indicates the stationary work permission mode by turning on the light. That is, the second information device 46 informs permission of stationary work by turning on the light, informs prohibition of stationary work by blinking or turning off the light, indicates permission by the second permission switch 42 by turning off the light, and indicates prohibition by the second permission switch 42 by turning on or blinking the light.

That is, the second information device 46 includes a light source, and, it can be easily known through changing a lighting form of a light source (light) whether a stationary work can be performed, whether a work can be performed by driving the front PTO shaft 19, or whether a work other than a stationary work can be performed by driving the rear PTO shaft 16.

The PTO shaft driving device in the working machine, includes the parking switch 23 configured to detect parking of the vehicle body 3, the first switch 21 located on the manipulator 10 located on the vehicle body 3 and configured to output a PTO shaft control command that is either the driving command to drive the PTO shaft located on the vehicle body 3 or the stopping command to stop the PTO shaft, the second switch 22 located at a position different from the manipulator 10 and configured to output a PTO shaft control command that is either a driving command to drive the PTO shaft or a stopping command to stop the PTO shaft, the first permission switch 41 configured to selectively permit or prohibit a stationary work when the parking switch 23 detects the parking, and the controller 24 to control driving of the PTO shaft. The controller 24 selectively drives or stops the PTO shaft according to the PTO shaft control command from the first switch 21 or the second switch 22 when the stationary work is permitted by the first permission switch 41. According to this configuration, the PTO shaft can be easily driven or stopped, for example, by operating the first switch 21 on the manipulator 10 or the second switch 22 located at a different position from the manipulator 10, after a driver (that is, an operator) operates the first permission switch 41 to permit a stationary work. That is, while there are many works to be performed with the PTO shaft being driven or stopped, the PTO shaft can be driven or stopped reliably in a stationary work by operating the first switch 21 and the second switch 22 after permitting or prohibiting a stationary work, thus improving workability.

The controller 24 stops driving of the PTO shaft when the controller 24 acquires the stopping command from the first switch 21 after the PTO shaft is driven according to the driving command from the second switch 22. According to this configuration, even when the PTO shaft is driven to perform a stationary work by operating the second switch 22 which is different from the manipulator 10, driving of the PTO shaft can be stopped through operation of the first switch 21 on the manipulator 10, thus making the stationary work more efficient.

The controller 24 stops driving of the PTO shaft when the controller 24 acquires both the driving command from the first switch 21 and the driving command from the second switch 22. According to this configuration, while the configuration is such that the PTO shaft can be driven to perform a stationary work through operations of the first switch 21 and the second switch 22, it is possible to return to a state before the start of driving of the PTO shaft by stopping the PTO shaft when the operation of first switch 21 coincides with the operation of second switch 22, thus stably performing a stationary work.

The PTO shaft driving device in the working machine includes the prime mover 4 to output a driving force for the PTO shaft. The controller 24 stops the prime mover 4 when the stationary work having been permitted is prohibited while the PTO shaft is driven. According to this configuration, in order to continue a work different from a stationary work, that is, to switch the stationary work to be prohibited while or after the PTO shaft is driven to perform the stationary work, driving of the prime mover 4 is stopped so that not only driving of the PTO shaft is stopped but also driving of the prime mover 4 is temporarily reset. As a result, a state where a stationary work is replaced by other work can be stably returned to the state before the work.

The controller 24 stops the prime mover 4 when the second switch 22 outputs the driving command while the stationary work is prohibited. According to this configuration, in order to perform another work after a stationary work even while the PTO shaft can be driven by the second switch 22 located at a different position from the manipulator 10, the prime mover 4 is stopped especially when the driving command is given through operation of the second switch 22 which is used easily in a stationary work so that another work can be started after the prime mover 4 is stopped for the other work, thus matching an operation of the second switch 22 and a timing to start the other work.

The PTO shaft driving device in the working machine includes the first information device 45 configured to output a warning when the second switch 22 outputs the driving command while the stationary work is prohibited. According to this configuration, for example, since the first information device 45 outputs a warning when transiting to another work after the stationary work, the warning can inform a worker or other person who operates the second switch 22 that it is necessary to transit to another work different from a stationary work.

The PTO shaft located on the vehicle body 3 is defined as the rear PTO shaft 16 of the working machine which includes the front PTO shaft 19 in addition to the rear PTO shaft 16. The PTO shaft driving device in the working machine includes the second permission switch 42 configured to selectively permit or prohibit driving of the front PTO shaft 19 when the second switch 22 outputs the driving command to drive both the rear PTO shaft 16 and the front PTO shaft 19, and the second information device 46 configured to optically inform of either permission and prohibition of the stationary work or permission and prohibition by the second permission switch 42. According to this configuration, a state where a stationary work is permitted or prohibited and a state where driving of the front PTO shaft 16 is permitted or prohibited can be easily known by the second information device 46.

The PTO shaft driving device in the working machine includes the seat switch 27 to detect sitting of a driver on the driver seat 6. When the seat switch 27 detects the sitting of the driver and the controller acquires the PTO shaft control command from the first switch, the controller 24 responds to the PTO shaft control command from the first switch 21 to drive or stop the PTO shaft. When the seat switch 27 does not detect the sitting of the driver and the controller acquires the PTO control command from the first switch 21, the controller 24 does not respond to the PTO shaft control command from the first switch 21 to drive or stop the PTO shaft.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A PTO shaft driving device in a working machine, the PTO shaft driving device comprising:
    a parking switch to detect parking of a vehicle body;
    a first switch located on a manipulator located on the vehicle body to output a PTO shaft control command that is either a driving command to drive a PTO shaft located on the vehicle body or a stopping command to stop the PTO shaft;
    a second switch located at a position different from the manipulator to output a PTO shaft control command that is either a driving command to drive the PTO shaft or a stopping command to stop the PTO shaft;
    a first permission switch to selectively permit or prohibit a stationary work when the parking switch detects the parking; and
    a controller configured or programmed to control driving of the PTO shaft; wherein
    the controller is configured or programmed to selectively drive or stop the PTO shaft according to the PTO shaft control command from the first switch or the second switch when the stationary work is permitted by the first permission switch.

2. The PTO shaft driving device in the working machine according to claim 1, wherein the controller is configured or programmed to stop driving of the PTO shaft when the controller acquires the stopping command from the first switch after the PTO shaft is driven according to the driving command from the second switch.

3. The PTO shaft driving device in the working machine according to claim 1, wherein the controller is configured or programmed to stop driving of the PTO shaft when the controller acquires both the driving command from the first switch and the driving command from the second switch.

4. The PTO shaft driving device in the working machine according to claim 2, wherein the controller is configured or programmed to stop driving of the PTO shaft when the controller acquires both the driving command from the first switch and the driving command from the second switch.

5. The PTO shaft driving device in the working machine according to claim 1, further comprising:
a prime mover to output a driving force for the PTO shaft; wherein
the controller is configured or programmed to stop the prime mover when the stationary work having been permitted is prohibited while the PTO shaft is driven.

6. The PTO shaft driving device in the working machine according to claim 2, further comprising:
a prime mover to output a driving force for the PTO shaft; wherein
the controller is configured or programmed to stop the prime mover when the stationary work having been permitted is prohibited while the PTO shaft is driven.

7. The PTO shaft driving device in the working machine according to claim 3, further comprising:
a prime mover to output a driving force for the PTO shaft; wherein
the controller is configured or programmed to stop the prime mover when the stationary work having been permitted is prohibited while the PTO shaft is driven.

8. The PTO shaft driving device in the working machine according to claim 4, further comprising:
a prime mover to output a driving force for the PTO shaft; wherein
the controller is configured or programmed to stop the prime mover when the stationary work having been permitted is prohibited while the PTO shaft is driven.

9. The PTO shaft driving device in the working machine according to claim 1, wherein the controller is configured or programmed to stop the prime mover when the second switch outputs the driving command while the stationary work is prohibited.

10. The PTO shaft driving device in the working machine according to claim 2, wherein the controller is configured or programmed to stop the prime mover when the second switch outputs the driving command while the stationary work is prohibited.

11. The PTO shaft driving device in the working machine according to claim 3, wherein the controller is configured or programmed to stop the prime mover when the second switch outputs the driving command while the stationary work is prohibited.

12. The PTO shaft driving device in the working machine according to claim 4, wherein the controller is configured or programmed to stop the prime mover when the second switch outputs the driving command while the stationary work is prohibited.

13. The PTO shaft driving device in the working machine according to claim 5, wherein the controller is configured or programmed to stop the prime mover when the second switch outputs the driving command while the stationary work is prohibited.

14. The PTO shaft driving device in the working machine according to claim 9, further comprising:
a first information transmitter to output a warning when the second switch outputs the driving command while the stationary work is prohibited.

15. The PTO shaft driving device in the working machine according to claim 10, further comprising:
a first information transmitter to output a warning when the second switch outputs the driving command while the stationary work is prohibited.

16. The PTO shaft driving device in the working machine according to claim 11, further comprising:
a first information transmitter to output a warning when the second switch outputs the driving command while the stationary work is prohibited.

17. The PTO shaft driving device in the working machine according to claim 12, further comprising:
a first information transmitter to output a warning when the second switch outputs the driving command while the stationary work is prohibited.

18. The PTO shaft driving device in the working machine according to claim 13, further comprising:
a first information transmitter to output a warning when the second switch outputs the driving command while the stationary work is prohibited.

19. The PTO shaft driving device in the working machine according to claim 1, wherein
the PTO shaft located on the vehicle body is defined as a rear PTO shaft of the working machine which includes a front PTO shaft in addition to the rear PTO shaft; and
the PTO shaft driving device further comprises:
a second permission switch to selectively permit or prohibit driving of the front PTO shaft when the second switch outputs the driving command to drive both the rear PTO shaft and the front PTO shaft; and
a second information transmitter to optically inform of either permission and prohibition of the stationary work or permission and prohibition by the second permission switch.

20. The PTO shaft driving device in the working machine according to claim 1, further comprising:
a seat switch to detect sitting of a driver on a driver seat; wherein
when the seat switch detects the sitting of the driver and the controller acquires the PTO shaft control command from the first switch, the controller is configured or programmed to respond to the PTO shaft control command from the first switch to drive or stop the PTO shaft; and
when the seat switch does not detect the sitting of the driver and the controller acquires the PTO shaft control command from the first switch, the controller is configured or programmed to not respond to the PTO shaft control command from the first switch to drive or stop the PTO shaft.

* * * * *